Oct. 31, 1933.  J. McGAVACK ET AL  1,932,632
ADHESIVE
Filed April 18, 1929
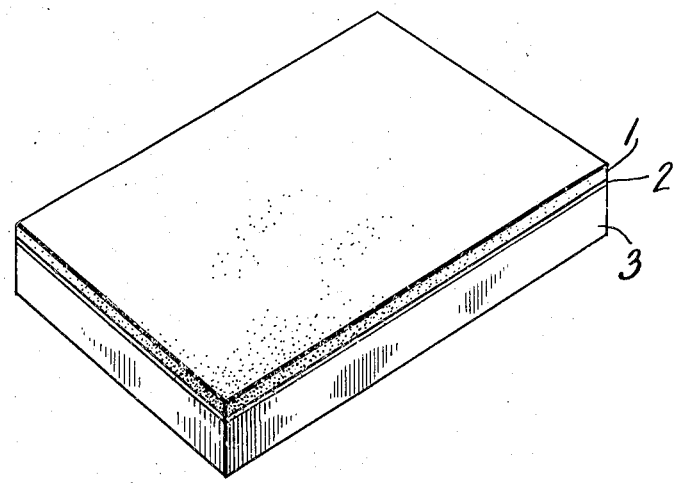
INVENTORS
John McGavack
Alexander A. Nikitin
BY
ATTORNEY Patented Oct. 31, 1933

1,932,632

UNITED STATES PATENT OFFICE 1,932,632

ADHESIVE

John McGavack, Jackson Heights, N. Y., and Alexander A. Nikitin, Passaic, N. J., assignors to The Naugatuck Chemical Company, Naugatuck, Conn., a corporation of Connecticut Application April 18, 1929. Serial No. 356,292

14 Claims. (Cl. 87—17)

This invention relates to adhesives, especially that type of adhesives which contains rubber latex in one form or another as an essential ingredient. The adhesives with which this invention is concerned are primarily intended for uniting rubber to metal. This invention also relates to a new article of manufacture composed of rubber and metal and a uniting adhesive.

Heretofore in the art of uniting rubber and metal adhesives which have been employed have been unsatisfactory mainly because sufficient adhesion between the adhesive and metal could not be obtained and that is especially true of those cements in which the rubber is in the form of the solution in an organic solvent. Some attempts have been made to render latex useful as an adhesive for uniting rubber to metal by the addition of hemoglobin or blood to the latex.

It is the object of this invention to provide an adhesive for uniting metal and rubber which makes use of latex in one form or another and to which is added certain compounding ingredients which increase the adhesion of the adhesive to the metal. Another object of this invention is to employ latex in the form of a stabilized acidified dispersion for making an adhesive which adheres readily to metal. Another object of this invention is to provide an adhesive in which rubber in the latex form is the essential ingredient and in which two classes of compounding ingredients, one consisting of proteins and the other of substances which thicken and stabilize the adhesive and at the same time increase the adhesion of rubber to metal are incorporated. It is also the object of this invention to provide a rubber containing adhesive in which sulphur in excess of the quantity necessary to effect vulcanization is employed for the purpose of increasing the adhesion of the adhesive to metal. Another object of this invention is to provide a new article of manufacture in which an undercured or partially undercured rubber stock is united to metal by a rubber containing adhesive. Other objects and advantages of the present invention will appear in the following detailed description.

The figure of the drawing represents a composite article made in accordance with the invention.

Without intending to limit the invention more than is required by the prior art and with some of the specific forms of the invention in mind, it may be stated that the invention broadly consists in an adhesive which contains rubber which may be in the form of latex of ordinary concentration which has been stabilized and acidified or which preferably is in the form of ammonia preserved latex which has been concentrated as by creaming or in the form of a latex which has been stabilized and acidified and concentrated. To one or the other of these various types of prepared rubber latices two classes of compounding ingredients are added. One class of compounding ingredients consists of proteins of the type exemplified by casein and the other consists of inert compounding ingredients of a character which thicken and stabilize the latex and increase the adhesive powers thereof and which are of the class exemplified by antimony pentasulphides. Suitable vulcanizing ingredients are included in the adhesive. While it is not necessary, an excess of sulphur over that required to effect vulcanization is advantageous.

While the rubber constituents of the latex may be of usual concentration, it is in all cases preferable to employ a concentrated latex. The latex may be concentrated by centrifuging or by filtering or preferably by creaming. The latex in the form of ammonia preserved latex of usual concentration may be creamed by the addition of one of various creaming agents such as alginates, preferably ammonium alginate, or by the addition of Irish moss or Iceland moss or pectin in small amounts such as .1 part up to 1 part by weight of the creaming agent per 100 parts by weight of rubber. The creaming agent is added, in the form of a solution having a concentration of approximately 2%, to the ammonia preserved latex. The mixture is allowed to stand for 24 hrs. whereupon the latex separates into a creamed rubber portion and a serum portion with nearly all of the rubber contained in the creamed portion, the creamed portion having from 50–60% of rubber by weight.

While a creamed latex made from ammonia preserved latex may be employed as the rubber constituent of an adhesive with highly satisfactory results, the rubber may be prepared in still another way which gives equally good, if not superior, results as compared with those obtained by the use of creamed latex. Such an alternative type of latex is that which has been rendered acidic by first adding a stabilizing agent followed by an acid. This acidified latex may be derived from either the natural latex when it is first collected from the trees or from the ammonia preserved latex. An example of acidified latex prepared from the latex in the form in which it exudes from the trees may be prepared as follows: To 1,000 ccs. of the natural latex is added 3–5 grams of the reaction product of cinnamic acid and butyl alcohol, in the presence of sulphuric acid or in the presence of chlor sulphonic acid. This reaction product acts as a stabilizer to prevent coagulation when the acidifying material is added. To the stabilized latex is added 10–15 cc. of approximately 35% formaldehyde solution which results in a stable latex having an acid reaction and a pH value of 5–7. In order to acidify the ammonia preserved latices the ammonia may be removed by blowing or its effect nullified by the precipitation of the hydroxyl ion as part of an insoluble compound or the hydroxyl ion may be removed by forming undissociated compounds therewith.

An example of an acidified stable latex prepared from ammonia preserved latex is as follows: To about 1,000 ccs. of latex containing approximately 38% solids is added 5–10 grams of the reaction product of para cresol and oleic acid in the presence of sulphuric acid or in the presence of chlor sulphonic acid. To this mixture is added 40 ccs. of 38% formaldehyde solution which renders the latex acidic and raises the hydrogen ion concentration to a pH value between 7 and 4½. The ammonia may be removed in this instance by blowing, or acetic or boric acid or formaldehyde may be added in a sufficient quantity to neutralize the ammonia and at the same time acidify the latex to the proper degree.

Another example of acidified latex which may be prepared from ammonia preserved latex is as follows: To 1,000 ccs. of latex containing approximately 36% rubber is added approximately 8 grams of the reaction product of butyl alcohol with cinnamic acid in the presence of sulphuric acid, followed by the addition of 30–35 ccs. of a 36% formaldehyde solution.

Other stabilizing agents such as the sodium or potassium salt of the reaction product of naphthalene and iso propyl alcohol in the presence of sulphuric acid may be employed. A 10% solution of such a sodium salt when added to rubber in proportion of 5 parts of the acid to 100 parts of rubber and allowed to stand 48 hrs. results in a stabilized latex which has a pH value from 5–4½. If desirable and if necessary a small amount of a 38% solution of formaldehyde may be added to decrease the pH value.

A stable acidified latex also may be prepared as follows: To rubber latex containing approximately 35% rubber is added the sodium salt of sulphonated undecylinic acid in the form of a 10% solution, there being added about .75% of the acid on the rubber. This mixture is allowed to stand so that the protein constituents of the latex may decompose and then .3% on the latex of formaldehyde is added followed by .5–2% on the rubber of phosphoric acid or 1–2% of picric acid. This gives a stabilized latex in which the pH value may be as low as 4.5. Such a latex when dried or when the rubber is deposited in any other suitable fashion gives a soft tacky rubber with strong adhesive properties.

As will be observed from the above examples the stabilizing agents which may be employed for acidified latices broadly include those made by the sulphonation of aromatic phenols and hydrocarbons in the presence of unsaturated aliphatic acids or may include aromatic acids sulphonated in the presence of aliphatic alcohols and also condensation products of aromatic hydrocarbons such as anthracene and naphthalene with aliphatic alcohols such as propyl, iso propyl, butyl or amyl in the presence of sulphuric acid or chlor sulphonic acid. Latices treated with the above stabilizing agents may be acidified with weak acids such as acetic or boric or picric or by the addition of formaldehyde which result in latices having a hydrogen concentration of approximately a pH value of 4.5. Attempts to use stronger acids with such stabilizing agents may result in the coagulation of the latex.

In cases where it is desirable to go below a pH of 4.5 a stabilizing agent such as saponin may be added to the latex either in the natural form or as ammonia preserved latex. For example 2 parts of saponin in the form of a 20% solution are added to latex containing 100 parts of total solids. To this mixture hydrochloric or sulphuric acids may be added so as to render the latex strongly acidic and to decrease the pH value below 4.5. In the place of saponin, arbutin or salicin may be used, although saponin is preferred.

For the purpose of this invention it is advantageous to concentrate an acidic latex of the type disclosed above. This is preferably effected by filtering the latex usually after allowing it to stand for a considerable length of time. The filtering operation raises the concentration of the rubber from approximately 35–38 to approximately 50 or 55%. This is desirable inasmuch as it facilitates the application of the adhesive in its final form. The acidic latex may be concentrated by creaming as in the case of ammonia preserved latex.

To a latex prepared as above described either in the unconcentrated or concentrated form and either in the form of acidified latex or plain creamed latex is added compounding ingredients of the protein type. Such protein compounding ingredients which have been found desirable include casein, egg albumen, corn gluten, gelatin and glue. These may be and preferably are added in the proportion of from 5–40 parts of the protein to 100 parts of rubber, although the preferred proportions of proteins are from 30–40 parts per 100 of rubber. These proteins are added in the form of colloidal solutions prepared by dispersing the protein in water with a high speed stirrer and by the application of some heat, and in the instance of casein by the addition of a small amount of alkali. The proteins thicken the latex thereby aiding in the application of the adhesive to the metal, and in addition the proteins add stability to the latex thereby facilitating the addition of other compounding ingredients without danger of coagulating the latex and also preventing the coagulation of the latex when the adhesive is being applied to the metal surface. Proteins also add to the adhesive qualities of the latex inasmuch as they adhere to metal more than does rubber. In addition the protein constituents tend to shorten the stretch of the rubber compound adjacent to the metal surface thereby decreasing the tendency of the metal and adhesive to separate under stress.

To the mixture of latex and proteins is added an adhesion strengthening material of inert nature such as antimony penta sulphide, powdered silica gel, iron oxide or magnesium oxide. These compounding ingredients give strength to the adhesive, make the adhesive more easily spread upon the metal surface and for some reason which is not known with certainty, these compounding ingredients add to the adhesive qualities of the compound. These compounding ingredients are added in the form of a paste made by mixing the ingredient with water and in approximately the same proportions as the protein compounding ingredients.

The compounding ingredients either of the protein or of the inert type may be added as individuals or as mixtures of several of the specific ingredients which have been enumerated.

Suitable vulcanizing ingredients which may include sulphur, zinc oxide and a suitable accelerator such as zinc dimethyl dithiocarbamate are added to effect vulcanization of the adhesive. Any other of the many well-known accelerators may be substituted as will be obvious to one skilled in the art. In addition to sulphur in the quantity necessary to effect vulcanization, sulphur is added as a compounding ingredient because of the fact that the sulphur, for a reason which is not clearly understood, also adds to the adhesive qualities of the adhesive, and especially increases its adhesion to metal. The sulphur is preferably added in the proportion of 5-20 parts per 100 of rubber.

Adhesives prepared as above described may be used to unite rubber to iron, especially, and also to other metals such as aluminum, copper and bronze. It is advantageous to increase the area of contact of the surface of the metal to which the cement is applied by scouring or by pitting the surface or in any other suitable manner. The surface of the metal should be cleaned of grease or other foreign substances preferably by sandblasting or by the use of a cleaning solution such as a mixture of potassium dichromate and sulphuric acid.

While an adhesive prepared as above described may be employed with top stocks of rubber which are to be fully vulcanized, it has been discovered that the adhesion obtained between a partially vulcanized top stock and the adhesive is greater than that in the case of a completely vulcanized top stock. For this reason it is preferable to use an undercured top stock where possible or to employ a top stock made up of two or more layers, one of which is adapted to contact with the adhesive and which contains an insufficient quantity of vulcanizing ingredients to effect a complete cure.

Other layers of the top stock may be of a composition which may be fully vulcanized. Examples of top stocks which may be united to metals by the above described adhesives are as follows:

*Example 1*

| | Parts by weight |
|---|---|
| Pale crepe rubber | 100 |
| Zinc oxide | 5 |
| Heptene base emulsion | .5 |
| Sulphur | 4 |

The heptene base is a vulcanization accelerator made by the condensation of heptaldehyde and aniline.

*Example 2*

| | Parts by weight |
|---|---|
| Pale crepe rubber | 100 |
| Gilders whiting | 65 |
| Magnesium oxide | 2.5 |
| Sulphur | 5 |

A suitable composition of adhesive for such top stocks is as follows:

| | Parts by weight |
|---|---|
| Rubber as latex | 100 |
| Saponin | 2 |
| Sufficient hydrochloric acid to give a pH value of 6 | |
| Casein | 40 |
| Sulphur | 20 |
| Zinc oxide | 1 |
| Zinc dimethyl dithiocarbamate | ½ |

An example of the type of rubber top stock which may be united to metal by the use of the creamed latex is as follows:

| | Parts by weight |
|---|---|
| Smoked sheet rubber | 30 |
| Whiting | 25 |
| Zinc oxide | 21 |
| Carbon black | .5 |
| Lime | 1 |
| Iron oxide | 10 |

The creamed latex adhesive applicable with such a type stock consists of creamed latex containing approximately 58% solids to which is added casein, glue or gelatin in any proportion from 20-40 parts to 100 of rubber to which is added sulphur from 5-20 parts, and to which is added antimony penta sulphide from 20-40 parts. Zinc oxide and an accelerator are added to effect vulcanization. Such an adhesive will unite the top stock to metal with a bond stronger than the rubber itself.

An example of an undercured top stock is as follows:

| | Parts by weight |
|---|---|
| Smoked sheet rubber | 100 |
| Sulphur | 2 |
| Zinc oxide | 4 |
| Mercapto zenzo thiazole | .1 |

In applying the adhesive it is applied on a metal surface by suitable spreading means such as a knife and allowed to dry at ordinary temperatures, which may require 24-48 hrs. depending upon temperature and humidity, or by drying at slightly elevated temperatures for a shorter time. When the adhesive has been dried the top stock, which has been prepared by milling and calendering in the usual manner, is applied over the adhesive by carefully rolling the top stock into contact with the adhesive in a manner which will eliminate air bubbles between the adhesive and top stock. This product is vulcanized at a temperature and for a length of time which is determined by the vulcanizing ingredients incorporated into the adhesive and top stock.

The various members of the group of protein compounding ingredients specified hereinabove have been found satisfactory in use. However, it has been found that of this group the casein results in an increased power between the adhesive and the metal as compared with those adhesives prepared with other members of the protein compounding group. Furthermore, the substances specified in the group of inert compounding ingredients have been found satisfactory in use, although antimony pentasulphide has been found to mix more readily with the latex and also results in a compound which is more easily spread than those compounds prepared with the other substances specified in the group of inert compounding ingredients. Therefore, the preferred form of the invention involves the use of casein and antimony pentasulphide as the compounding ingredients.

While the most satisfactory type of adhesive is obtained by the use of both the protein compounding ingredients and the inert compounding ingredients, it has been found possible to prepare adhesives which are satisfactory for some purposes, and which involve either the use of one or more of the members of the protein group alone, or the use of one or more members of the group of inert compounding ingredients alone.

In the drawing illustrating the invention there is shown a composite rubber and metal article in the form of a sheet, in which the numeral 1 represents a layer of rubber, 2 represents a layer of the adhesive, and 3 represents a layer of metal.

While a variety of methods and materials for preparing the different kinds of latices have been described, it is not intended to limit the invention to the examples given inasmuch as both the operations and materials involved may be altered without departing from the scope and spirit of the invention. Moreover, the compounding ingredients, both of the protein type and the inert type, are merely exemplary of the particular classes of materials to which they belong, and there are other materials which may be substituted therefor which are the equivalent thereof for the purposes of this invention and are intended to be included within the scope of this invention.

Having thus described our invention, what we claim and desire to protect by Letters Patent is:

1. An adhesive comprising concentrated acidified latex; material from the group consisting of casein, glue, gelatin, corn gluten and egg albumen; material from the group consisting of antimony penta sulphide, powdered silica gel, iron oxide and magnesium oxide; and vulcanizing ingredients, the latter including sulphur in excess of the quantity necessary to effect vulcanization.

2. An adhesive comprising concentrated acidified latex; material from the group consisting of casein, glue, gelatin, corn gluten and egg albumen; material from the group consisting of antimony penta sulphide, powdered silica gel, iron oxide and magnesium oxide; and vulcanizing ingredients.

3. An adhesive comprising acidified latex; material from the group consisting of casein, glue, gelatin, corn gluten and egg albumen; material from the group consisting of antimony penta sulphide, powdered silica gel, iron oxide and magnesium oxide; and vulcanizing ingredients.

4. An adhesive comprising creamed latex; material from the group consisting of casein, glue, gelatin, corn gluten and egg albumen; material from the group consisting of antimony penta sulphide, powdered silica gel, iron oxide and magnesium oxide; and vulcanizing ingredients.

5. An adhesive comprising material of the group consisting of concentrated acidified latex, acidified latex and creamed latex; material from the group consisting of casein, glue, gelatin, corn gluten and egg albumen; material from the group consisting of antimony penta sulphide, powdered silica gel, iron oxide and magnesium oxide; and vulcanizing ingredients, the latter including sulfur in excess of the quantity necessary to effect vulcanization.

6. An adhesive comprising concentrated acidified latex; material of the group consisting of casein, glue, gelatin, corn gluten and egg albumen; and vulcanizing ingredients.

7. An adhesive comprising acidified latex; material of the group consisting of casein, glue, gelatin, corn gluten and egg albumen; and vulcanizing ingredients.

8. An adhesive comprising creamed latex; material of the group consisting of casein, glue, gelatin, corn gluten and egg albumen; and vulcanizing ingredients.

9. An adhesive consisting of acidified latex and proteinous and filling compounding materials added thereto together with vulcanizing ingredients.

10. An adhesive consisting of creamed latex, proteinous stabilizing materials and adhesion strengthening material added thereto together with vulcanizing ingredients.

11. An adhesive consisting of a concentrated acidified latex and proteinous and filling compounding materials added thereto together with vulcanizing ingredients.

12. An adhesive comprising material from the group consisting of concentrated acidified latex, acidified latex and creamed latex; and material from the group consisting of casein, glue, gelatin, corn gluten and egg albumen.

13. An adhesive comprising material from the group consisting of concentrated acidified latex, acidified latex and creamed latex; and material from the group consisting of antimony penta sulphide, powdered silica gel, iron oxide and magnesium oxide.

14. An adhesive comprising concentrated acidified latex and vulcanizing ingredients.

JOHN McGAVACK.
ALEXANDER A. NIKITIN.